United States Patent
Meuleman et al.

(10) Patent No.: US 9,935,925 B2
(45) Date of Patent: Apr. 3, 2018

(54) METHOD FOR ESTABLISHING A CRYPTOGRAPHICALLY PROTECTED COMMUNICATION CHANNEL

(71) Applicant: Intrinsic-ID B.V., Eindhoven (NL)

(72) Inventors: Derk Jan Meuleman, Kessenich (BE); Roel Maes, Geel (BE); Geert Jan Schrijen, TD Venlo (NL)

(73) Assignee: INTRINSIC ID B.V., Eindhoven (NL)

( * ) Notice: Subject to any disclaimer, the term of this patent is extended or adjusted under 35 U.S.C. 154(b) by 270 days.

(21) Appl. No.: 14/864,582

(22) Filed: Sep. 24, 2015

(65) Prior Publication Data
US 2016/0099920 A1    Apr. 7, 2016

(30) Foreign Application Priority Data

Oct. 3, 2014 (EP) ..................................... 14187667
Jul. 3, 2015 (EP) ..................................... 15175232

(51) Int. Cl.
*H04L 29/06* (2006.01)
*H04L 9/08* (2006.01)
*H04W 12/04* (2009.01)
*H04L 1/16* (2006.01)

(52) U.S. Cl.
CPC ............ *H04L 63/0435* (2013.01); *H04L 1/16* (2013.01); *H04L 9/0827* (2013.01); *H04L 9/0841* (2013.01); *H04L 9/0869* (2013.01); *H04L 63/18* (2013.01); *H04W 12/04* (2013.01); *H04L 2209/60* (2013.01); *H04L 2209/80* (2013.01)

(58) Field of Classification Search
CPC ... H04L 63/0435; H04L 63/18; H04L 9/0869; H04W 12/04
See application file for complete search history.

(56) References Cited

U.S. PATENT DOCUMENTS

| | | | |
|---|---|---|---|
| 8,254,579 B1* | 8/2012 | Morgan | H04L 9/083 380/277 |
| 8,850,200 B1* | 9/2014 | Horgan | H04L 63/0428 380/277 |
| 2007/0133803 A1* | 6/2007 | Saito | H04L 29/12009 380/267 |
| 2008/0072296 A1* | 3/2008 | Bensimon | H04L 63/0428 726/4 |
| 2010/0250796 A1* | 9/2010 | Jevans | G06F 21/606 710/36 |
| 2012/0272058 A1* | 10/2012 | Wang | H04L 63/0464 713/156 |

(Continued)

*Primary Examiner* — Ellen Tran
(74) *Attorney, Agent, or Firm* — Kenealy Vaidya LLP

(57) ABSTRACT

Some embodiments are directed to a cryptographic method for providing an electronic first device, an electronic second device and an electronic intermediary device, the cryptographic method establishing a cryptographically protected communication channel between the first device and the second device. The method comprises establishing a session identifier (SID) between the first device and the intermediary device. The first device sends the session identifier and a first key element to the second device over an out-of-band channel. The second device sends a registration message comprising the session identifier to the intermediary device. The first and derived at the first and second device.

18 Claims, 7 Drawing Sheets

(56) References Cited

U.S. PATENT DOCUMENTS

| | | | | |
|---|---|---|---|---|
| 2013/0005368 A1* | 1/2013 | Hunziker | ............ | H04W 12/10 455/466 |
| 2013/0232554 A1* | 9/2013 | Campagna | ............ | H04L 63/08 726/4 |
| 2013/0333006 A1* | 12/2013 | Tapling | ............ | G06F 21/42 726/6 |
| 2014/0164768 A1* | 6/2014 | Kruglick | ............ | H04L 63/062 713/168 |

* cited by examiner

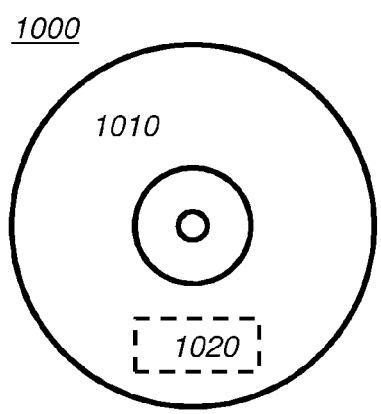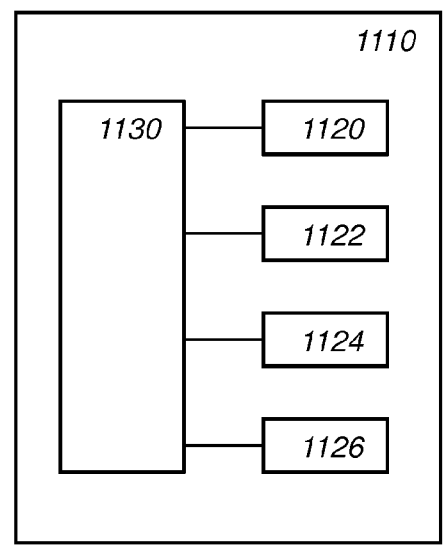
Fig. 6a
Fig. 6b

METHOD FOR ESTABLISHING A CRYPTOGRAPHICALLY PROTECTED COMMUNICATION CHANNEL

CROSS REFERENCE TO RELATED APPLICATION

This application claims the priority benefit under 35 U.S.C. § 119 of European Patent Application No. 14187667.2, filed on Oct. 3, 2014, and European Patent Application No. 15175232.6, filed on Jul. 3, 2015, the contents of which are hereby incorporated in their entireties by reference.

FIELD OF THE INVENTION

The invention relates to a cryptographic method for an electronic first device, an electronic second device and an electronic intermediary device, an electronic intermediary device, an electronic first device, an electronic second device, a computer program, a computer readable medium.

BACKGROUND

The mobile (smart)phone is becoming an increasingly important device in security related applications. More and more people use their phone for securing transactions over the Internet; banks allow users to check their balance and transfer small amounts of money via applications on their smartphone, home automation devices are controlled via the smartphone and a user's mobile phone is often used as a second factor for authentication (e.g. out of band unique code sent via SMS or out of band verification message sent to smartphone app) towards cloud services.

As smartphones are personal devices, carried together with the user at all or most times, they are suitable to increase security to relatively high levels. In support of this trend, several mobile device makers are adding technology to strengthen the security of the mobile phone platform. Secure elements are added to the phone's hardware, but also more advanced security software is developed for this purpose, varying from secure mobile platform software to secure element technologies that interact with servers in the cloud.

However, even though an increasing number are being performed on a smartphone, a number of operations will not migrate to the smartphone; television, desktop computers, tablets, and the like continue to be important.

There is therefore a need to setup a secure connection between a first device of a user, say a computing device, such as a PC, laptop, tablet, and the like, and a second device of the user, say his/her smartphone. Currently, to establish a connection between a first device and a second device several connection technologies may be used.

For security and speed, a direct channel such as NFC, USB or Bluetooth seems ideal. However these direct channels also come with several inconveniences. The user preferably does not want to hassle with additional cables (USB) and none of these technologies is universally available (NFC is not widely adopted, Bluetooth is typically present on laptops but not on regular PCs, not all tablets have a USB port).

A much more generic and convenient way of setting up a secure channel between phone and computing device would be to use a computer network connection, e.g. over the Internet. One may assume nowadays that almost all devices have a network connection. However, connecting over the Internet on the other hand presents its own security challenges since many attacks come from the network side. An additional problem that we face when setting up connections via the Internet is ease of use. The end-user does not want to configure routers and firewalls to make such a channel possible. A secure and elegant solution is therefore needed.

SUMMARY OF THE INVENTION

It would be advantageous to have a method for establishing a cryptographically protected communication channel between a first device and a second device that does not require a pre-existing shared key stored at both devices, and that does not require the device to receive incoming connections over a computer network.

A cryptographic method for an electronic first device, an electronic second device, and an electronic intermediary device is provided that establishes a cryptographically protected communication channel between the first device and the second device. The first device and the second device are arranged to digitally communicate with the intermediary device over a computer network. The method comprises
- by the first device and/or the intermediary device: establishing a session identifier,
- by the first device: generating a first random number and determining a first key element from at least the first random number, the first key element being arranged for later constructing a shared cryptographic key shared between the first device and the second device,
- by the first device: sending the session identifier and the first key element to the second device over an out-of-band channel,
- by the first device: applying a key derivation function to at least the first random number thus obtaining the shared cryptographic key for protecting communication,
- by the second device: applying a key derivation function to at least the first key element thus obtaining the shared cryptographic key,
- by the second device: sending a registration message comprising the session identifier to the intermediary device,
- by the first device and/or second device: communicating over the cryptographically protected communication channel by:
  generating a message,
    cryptographically protecting the message using the shared cryptographic key,
    sending said cryptographically protected message to the intermediary device, and
    by the intermediary device: forwarding said cryptographically protected message to the other of the first or second device.

The first device and the second device need only to establish an outgoing connection to the intermediary device. Both the connections are associated by intermediary server with the same session identifier. This enables the intermediary device to pass communication from one of the first and second device on to the other. However, the first key element does not pass through the intermediary device. Accordingly, communication is protected from the intermediary device by protecting the communication with the shared key which is derived from the first key element.

In an embodiment, the intermediary device may identify to which one of the first device and the second device the cryptographically protected message should be forwarded from the communication channel over which the message arrived at the intermediary device. In this way it is not needed to include the session identifier with all messages passed over the cryptographically protected channel.

In an embodiment, the out-of-band channel may be created by encoding the session identifier and the first key element in a computer readable image and displaying the image on a display screen, by the first device. The second device may obtain the computer readable image from the display screen using an image sensor and decoding said obtained computer readable image thus obtaining the session identifier and the first key element.

An aspect of the invention concerns the first device, the second device, the intermediary device, and computer programs for implementing the method on computers.

The methods described herein may be applied in a wide range of practical applications. Such practical applications include content management, e.g., cloud storage or DRM, and secret management, e.g., password managers. The cryptographically protected channel may be applied in other applications.

A method according to the invention may be implemented on computers as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention concerns a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows in the form of a block diagram an example of an embodiment of a cryptographic system 10 for establishing a cryptographically protected communication channel between a first device and a second device FIG. 2a schematically shows in the form of a sequence diagram an example of an embodiment of a cryptographic method for establishing a cryptographically protected communication channel between a first device and a second device, FIG. 2b schematically shows in the form of a block diagram an example of an embodiment of a registration memory, FIG. 2c schematically shows in the form of a block diagram an example of an embodiment of a registration memory, FIG. 3 schematically shows in the form of a sequence diagram an example of an embodiment of a cryptographic method for establishing a cryptographically protected communication channel between a first device and a second device.

FIG. 6a shows a computer readable medium having a writable part comprising a computer program according to an embodiment, FIG. 6b shows a schematic representation of a processor system according to an embodiment.

LIST OF REFERENCE NUMERALS IN FIG. 1-3

Figure 1:
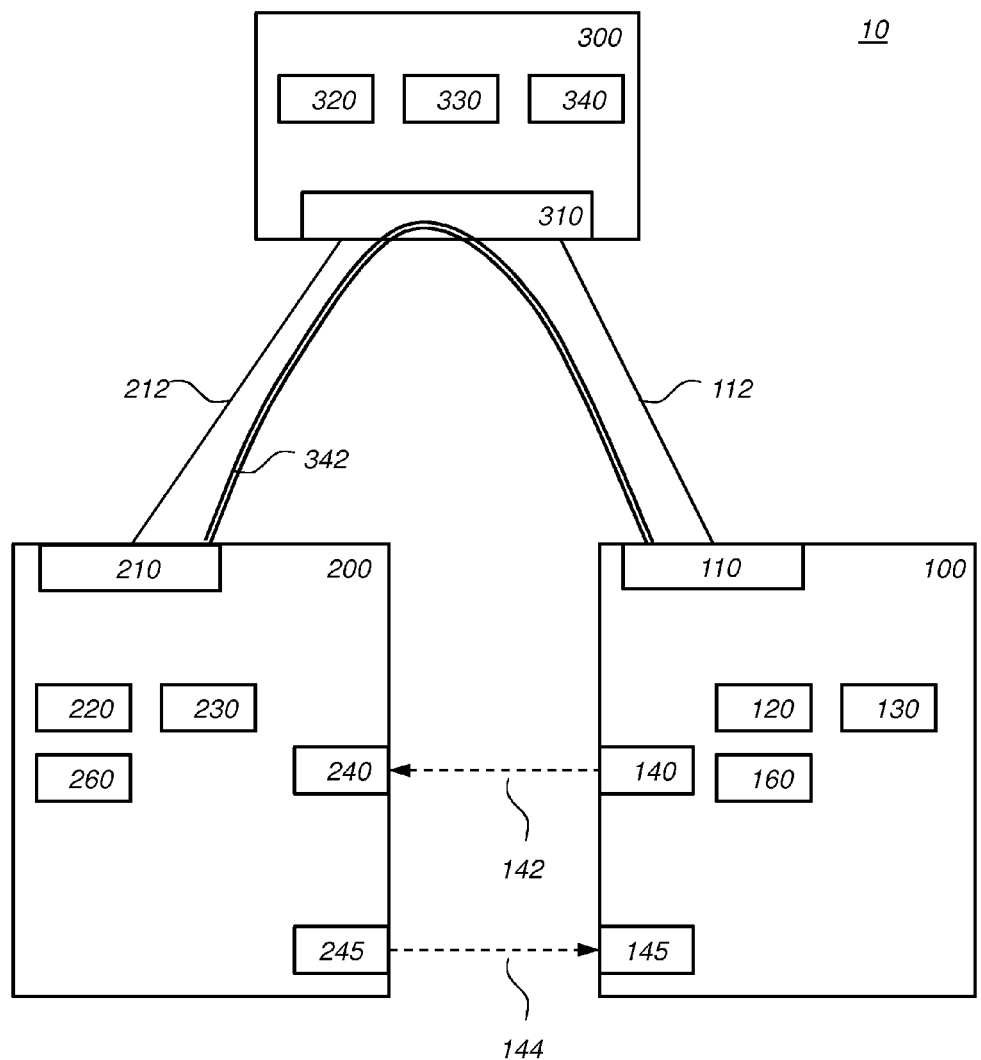

10 a cryptographic system
11 secrets management system
12 content management system
100, 100', 100" a first device
110 a communication unit
112 a first computer network connection
120 session identifier unit
130 a cryptographic unit
140 a sending out-of-band communication unit
142 a first out-of-band channel
144 a second out-of-band channel
145 a further receiving out-of-band communication unit
160 a message unit
200, 200', 200" a second device
210 a communication unit
212 a second computer network connection
220 a registration unit
230 a cryptographic unit
240 a receiving out-of-band communication unit
245 a further sending out-of-band communication unit
260 a message unit
300 an intermediary device
310 a communication unit
320 a session identifier unit
330 a registration unit
331, 331' a registration memory
340 a forwarding unit
332, 335 a session identifier
333, 336 a first handle of a first communication channel
334, 337 a second handle of a second communication channel
353, 356 a computer network address of a first device
354, 357 a computer network address of a second device
342 a cryptographically protected communication channel
400, 400' a cryptographic method
401 by the first device: sending a session request to the intermediary device,
402 by the intermediary device: selecting a session identifier,
403 by the intermediary device: sending the session identifier to the first device,
404 by the first device: generating a first random number ($\alpha$)
405 by the first device: determining a first key element (e.g. $\alpha$; $g^\alpha \bmod p$) (405) from at least the first random number
406 by the first device: sending the session identifier and the first key element to the second device over an out-of-band channel, 407 by the second device: generating a second random number ($\beta$)
408 by the second device: determining a second key element (e.g. $\beta$; $g^\beta$ mod p) from at least the second random number,
409 by the second device: sending a registration message comprising the session identifier to the intermediary device; sending (optional) the second key element to the intermediary device together with the session identifier,
410 by the intermediary device: forwarding the second key element to the first device,
411 by the second device: generating a third random number ($\gamma$)
412 by the second device: sending the third random number to first device over a further out-of-band channel requiring human interaction with the first device
413 by the first device: applying a key derivation function to at least the first random number thus obtaining the shared cryptographic key for protecting communication,
414 by the second device: applying a key derivation function to at least the first key element thus obtaining the shared cryptographic key,
415 by the second device: generating a random number ($\delta$), sending the random number over the established cryptographically protected communication channel to the first device,
416 by the second device: generating a message,
417 by the second device: cryptographically protecting the message using the shared cryptographic key,
418 by the second device: sending said cryptographically protected message to the intermediary device
419 by the intermediary device: selecting the other of the first or second device and forwarding said cryptographically protected message to the other of the first or second device.
420 by the first device: obtaining user confirmation that the generated random number equals the random number received by the first device.
510 a storage
511, 513 a secret
512, 514 a secret identifier
521 a first key manager
522 a second key manager
531 a first content management unit
532 a second content management unit
540 a content server
542 encrypted content key
543 encrypted content

DETAILED DESCRIPTION OF PREFERRED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

Figure 2A:
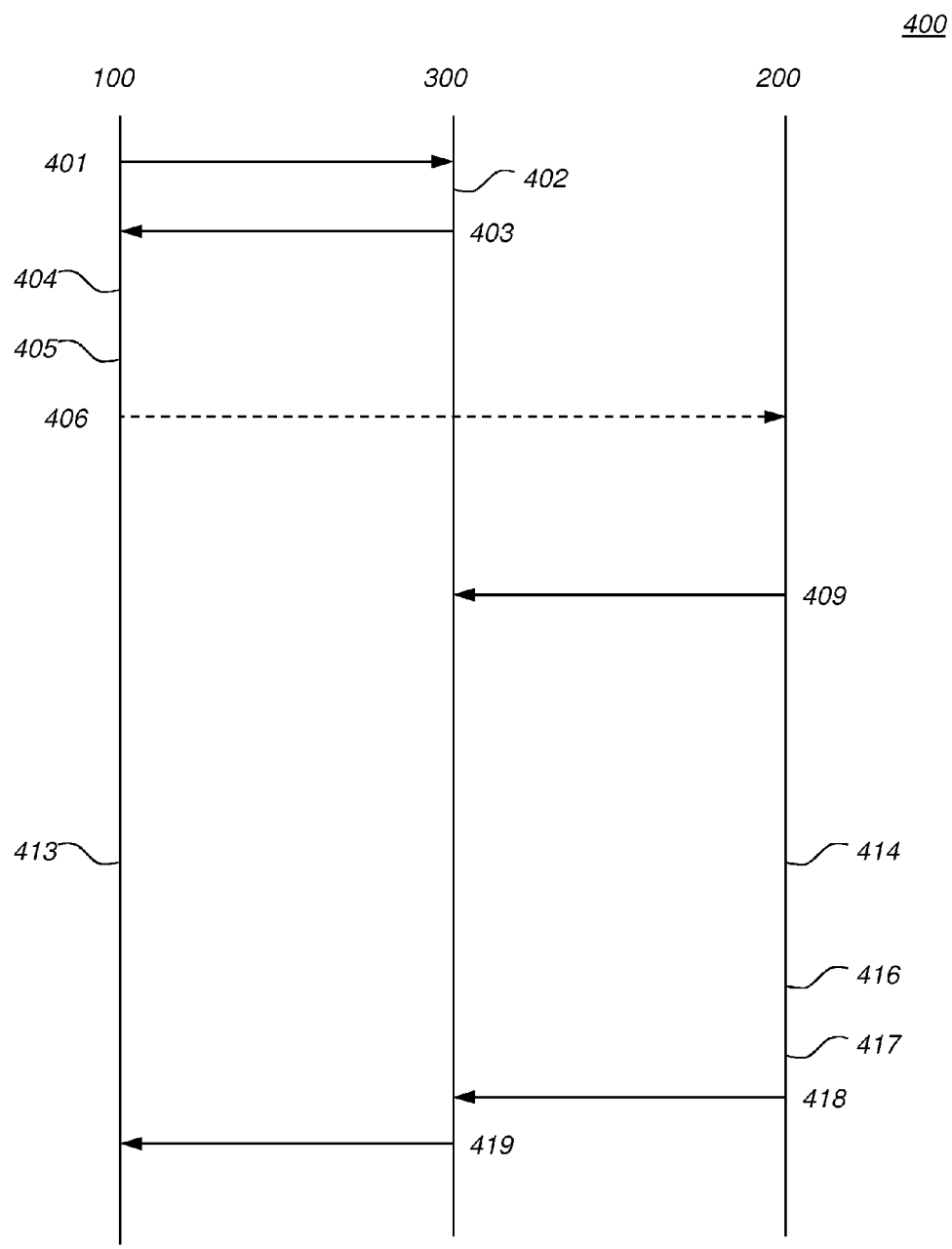

FIG. 1 schematically shows an example of an embodiment of a cryptographic system 10 for establishing a cryptographically protected communication channel 342 between a first device 100 and a second device 200. FIG. 2 schematically shows an example of an embodiment of a cryptographic method for establishing a cryptographically protected communication channel 342 between a first device 100 and a second device 200. A method illustrated with FIG. 2 may be performed using the devices illustrated with FIG. 1; for convenience, FIGS. 1 and 2 will be discussed below together.

System 10 comprises a first device 100, a second device 200, and an intermediary device 300. The first device 100 and the second device 200 are arranged to digitally communicate with the intermediary device over a computer network (not separately shown in FIG. 1). The computer network may be, e.g., a local area network (LAN), or a wide area network (WAN), or a TCP and/or UCP network, e.g. the Internet.

System 10 establishes a cryptographically protected communication channel 342 between the first device 100 and the second device 200. Channel 342 has schematically been indicated as a double line in FIG. 1. All communication over channel 342 runs through the intermediary device. Once devices 100 and 200 have established channel 342, these devices need not have any direct connection. All messages exchanged between first and second device 100 and 200 runs over the intermediary device 300. Nevertheless, the communication running over this channel is protected. Even attackers having access to intermediary device 300 and/or access to the computer network communication between devices 100, 200 and 300 cannot read and/or forge the communication.

The intermediary device 300 comprises a communication unit 310 arranged to communicate with the first device 100 and the second device 200 over the computer network. The first device 100 comprises a communication unit 110 arranged to communicate with the intermediary device over a computer network. The second device 200 comprises a communication unit 210 arranged to communicate with the intermediary device over a computer network For example, the first device 100 may be a television, a set-top box, a computer, e.g., a desktop computer, a tablet, a laptop, and the like. For example, the second device may be a mobile device, such as a mobile phone, e.g. a smartphone, a tablet, a laptop, and the like.

Typically, communication units 110, 210 and 310 are arranged for the same computer network. For example, they may all be arranged to connect over the internet. For example, communication units 110, 210, and 310 may be a wired or wireless connection, e.g., an Ethernet connection, a Wi-Fi connection, or a mobile data connection (3G/4G), etc.

For example, communication units 110 and 210 may each have a Wi-Fi connection. Nevertheless, first device 100, and second device 200 need not be able to use their connection unit to directly communicate with each other. Configuring two electronic devices, say devices 100 and 200 to establish a direct connection that does not run via an intermediary connection is typically hard, if not impossible.

The type of computer network used between the first device 100 and the intermediary device 300 is typically the same as the type of computer network used between the second device 200 and the intermediary device 300, e.g., the Internet. However, this is not needed, as the first and second network do not communicate directly, they may use a different type of computer network connection to the intermediary. For example, the computer network may comprise a first computer network and a second computer network connected through the intermediary device 300; intermediary 300 and first device 100 may both be connected to a first computer network, say a company LAN, whereas the second device 200 is not connected to the first computer network, but to a second computer network say the Internet. This embodiment may be used for companies that have a so-called bring your own device (BYOD) policy, as it allows a user to connect his second device, say his phone, to a first device, say a company computer, over a secure connection.

The intermediary device 300 comprises a session identifier unit 320 arranged to establish a session identifier (SID) with the first device 100. In an embodiment, first device 100 comprises a session identifier unit 120 arranged to establish the session identifier (SID) with the intermediary device.

Establishing the session identifier may be done in a number of ways. Three options are discussed below.

A first option is illustrated in sequence diagram 400. A sequence diagram is a diagram that shows how devices operate and interact with each other and in what order. In FIG. 2a, a time line is shown for devices 100, 200 and 300. Time runs from the top of FIG. 2 to the bottom. Events, e.g., operations and messages, are indicated with reference numbers. Messages sent from one device to another are schematically illustrated with horizontal arrows; the arrow part indicating the addressee. Out-of-band messages are indicated with dashed arrows. FIG. 2 indicates a possible order. An embodiment follows the time ordering indicated in FIG. 2, nevertheless alternative time orders are possible. Generally, events may be performed earlier relative to other events, so long as information needed for the event is available at the device.

In the first option, the first device 100 sends 401 a session request to the intermediary device 300, e.g., by the session identifier unit 120. The intermediary device 300 selects 402 a session identifier and sends 403 the session identifier to the first device 100.

The session identifier uniquely identifies the protected channel 342, at least among all protected channels that are supported at the same time by intermediary device 300. For example, the session identifier is a random 128 bit integer; e.g., intermediary device generates the session identifier using a random number generator of intermediary device 300.

This option requires little effort on the part of the first device 100. Information received from the intermediary device 300 may be forwarded to the second device 200 with no or little additional processing.

In a second option (not shown), the session identifier is selected by the first device 100, e.g. generated using a random number generator of first device 100. The session identifier may send to the intermediary device 300 together with the session request. The intermediary device 300 may reject the request if the session identifier is already in use.

In yet a third option (not shown), the first device 100 and intermediary device 300 each generate an intermediate session identifier and send the intermediate session identifier to the other party. The session identifier is constructed from the intermediate session identifiers, e.g., by applying an XOR or a cryptographic hash to them.

First device 100 and intermediary device 300 may use a first computer network connection 112 over the computer network for all their communication, including, e.g., the session request, session identifier, etc. First computer network connection 112 runs between communication unit 310 and 110.

First device 100 comprises a cryptographic unit 130. The cryptographic unit is arranged to generate a first random number. The first random number will be referred to as α. For example, the random number may be generated 404 by a random number generator of the cryptographic unit 130. In general, random numbers may be true random or pseudo-random.

Unit 130 is further arranged to determine 405 a first key element from at least the first random number. The first key element is arranged for later constructing a shared cryptographic key shared between the first device and the second device.

In an embodiment, the first key element is the same as the first random number. This option is acceptable for many applications, however, to protect against attackers who have access both to information from sniffing the computer network and from information obtained from snooping on the out-of-band channels (see below), the first key element may be chosen to depend on the first random number in a one-way manner. This option is expanded upon below.

Continuing the description of FIGS. 1 and 2, we will assume the first key element is the same as the first random number. The size of the first random number and of the first key element is preferably at least as large as the size of the shared cryptographic key, say 128 bits, 256 bits, etc.

Generating the first random number a by the first device 100 has been indicated in FIG. 2 at reference numeral 404.

First device 100 comprises a sending out-of-band communication unit 140 arranged to send 406 the session identifier and the first key element to the second device 200 over an out-of-band channel 142. The second device 200 comprises a receiving out-of-band communication unit 240 arranged to receive the session identifier and the first key element from the first device 100 over the out-of-band channel 142.

In cryptography, an out-of-band channel is a communication channel separate from the primary network. In this case, the out-of-band channel does not use the computer network, including computer network connections 112 and 212 (see below). The out-of-band channel is thus protected from sniffing the computer network. The first key element does not pass through the intermediary device 300.

In an embodiment, sending out-of-band communication unit 140 is arranged to encode the session identifier and the first key element in a computer readable image and displaying the image on a display screen, say on a display screen connected to or comprised in the first device 100. The computer readable image may be matrix barcode code, a bar code, etc. A matrix barcode is also referred as a two-dimensional barcode. For example a Quick Response Code (QR) code may be used as the matrix barcode.

The receiving out-of-band communication unit 240 is arranged to obtain the computer readable image from the display screen using an image sensor and decoding said obtained computer readable image thus obtaining the session identifier and the first key element. The image sensor may be comprised in the second device 200. For example, the image sensor may be a camera of second device 200.

The first out-of-band channel 142 may be, for example, an optical channel, such as a computer readable image and a camera, or a electromagnetically wireless channel, etc. The latter may be use NFC, Bluetooth, or wireless USB, etc. A wired connection is also possible, say USB. An optical channel has the advantage that a line of sight is needed, this makes it easy for a user of the first device to know if someone may have access to the first out-of-band channel 142.

In an embodiment, first device 100 is arranged to send a computer network address of the intermediary device over the out-of-band channel to the second device, e.g., together with the session identifier and the first key element. In this way the second device may be used together with first device even though they do not share a common address of an intermediary device. Sharing the address of the intermediary device in this way is safe, as the intermediary device need only to be semi-trusted.

Second device 200 comprises a registration unit 220 arranged to send 409 a registration message comprising the session identifier to the intermediary device 300. Intermediary device 300 comprises a registration unit 330 arranged to receive a registration message comprising the session identifier from the second device.

Second device 200 and intermediary device 300 may use a second computer network connection 212 over the computer network for all their communication, including, e.g., the registration message.

First network connection 112 and second connection 212 may itself be a protected connection. In particular, it may be required that the first and second network connections 112 and 212 are authenticated channels. Having intermediary device 300 authenticate itself to first and second device 100 and 200 avoids that these devices engage which the wrong spoofed intermediary device. Although using a spoofed device would not compromise confidentiality, this may compromise privacy. The spoofed device may record which devices communicate with each other and when. Encrypting first and second connection 112, 212 will also increase security. For example, first network connection 112 and second connection 212 may itself be a protected connection may be according to, e.g., Secure Sockets Layer (SSL), Transport Layer Security, Hypertext Transfer Protocol Secure (HTTPS), Web Services Security (WSS), and the like. The first and second device may not be able to establish a connection with each other using such protected connection protocols, for several reasons. Although, both the first device 100 and the second device 200 are able to establish computer network connections to the intermediary device 300, as these are not usually blocked by firewalls, incoming connections of these kind may be blocked. Moreover, the first and second device do not yet share a common secret, and may not even have access to a network address of each other. The second device would have no way to verify whether an incoming connection that is purportedly from the first device is actually from the first device. The first and second device may the same type of protected connection, but this is not necessary.

When the session identifier is established, the registration unit of the intermediary device may associate the session identifier with the first device 100. When the intermediary device 300 receives the registration message it further associates the second device 200 to the session identifier, so that first and second device 100 and 200 are associated with each other. Instead of associating devices with the session identifier, registration unit 330 may associate the first and second connection 112, 212 with the session identifier.

To protect communication between them the first and second device 100, 200 derive a shared cryptographic key.

For example, cryptographic unit 130 of first device 100 may apply a key derivation function to at least the first random number thus obtaining the shared cryptographic key for protecting communication. For example, cryptographic unit 230 of second device 200 may apply a key derivation function to at least the first key element thus obtaining the shared cryptographic key. If the key elements are the same as random numbers, the key derivation may directly be applied to the random number(s).

The first device and the second device do not necessarily have access to the same information, e.g., if the first key element does not equal the first random number, however they do derive the same shared cryptographic key. The shared cryptographic key may be a symmetric key, say of 128 bit.

For example, if the first key element equals the first random number, the first and second device may use the same key derivation function. The key derivation function may hash the first random number. As will be discussed below the key derivation function may be applied to additional information than the first random number. For example, the key derivation function may be "HKDF" specified in RFC 5869.

At this point the first device 100, the second device 200, and the intermediary device 300 have established the cryptographically protected communication channel between the first device 100 and the second device 200.

First and second device 100, 200 may communicate over the cryptographically protected communication channel For example, to send a message from the second device 200 to the first device 100 over the cryptographically protected communication channel, the second device may proceed as follows.

Second device 200 comprises a message unit 260 arranged to generate 416 a message. The message unit cryptographically protects 417 the message using the shared cryptographic key. For example, the message unit may employ the cryptographic unit for this purpose. Cryptographically protecting a message may comprise encrypting and/or authenticating the message using the shared cryptographic key. For example, the message may be protected using an authenticated encryption algorithm, say running a block cipher configured with the shared cryptographic key in a suitable mode, say Galois/Counter Mode. The block cipher may be AES. The message unit sends 418 the cryptographically protected message to the intermediary device, say over the computer network connection 212.

Intermediary device 340 comprises a forwarding device 340 arranged to receive a message cryptographically protected using a shared cryptographic key from the second device 200, selecting the associated first device, and to forward said cryptographically protected message to the other of the first or second device.

For example, the forwarding device may receive the message over network connection 212 and forward the message to associated connection 112.

The first device comprises a message unit 160 arranged to receive the message cryptographically protected using the shared cryptographic key, and to decrypt and/or validate, i.e., verify the authenticity, said received message using the shared cryptographic key, e.g., using the cryptographic unit.

The first and second device can communicate in a protected manner, using an intermediary, thus avoiding establishing a direct connection between the first and second device. The intermediary device may be referred to as semi-trusted. Contrary to a so-called trusted third party, it is not needed to trust the intermediary device to keep the communication running through it confidential or to trust the intermediary device to warrant the integrity thereof. Interestingly, the first and second device need not share a secret before the cryptographically protected channel may be established.

The semi-trusted intermediary may have to be trusted for quality assurance, e.g., that it will timely forward messages. An adverse party who seizes the intermediary device may cause communication between the first and second device to seize, however he will not gain access to said communication. By attacking the intermediary device 300, a denial of service attack may be mounted. This problem may be addressed by sending a network address of the intermediary device together with the session identifier to the second device. In this way the first and second device may quickly and easily switch to a different intermediary device. For example, the first device may store a list of network addresses of multiple intermediary devices. The first device may select an intermediary device of the list, and switch to a next one if setting up the protected channel through the selected intermediary device fails.

The semi-trusted intermediary may also have to be trusted for privacy. For example, the intermediary device may record which devices connect to each other, for how long and when, etc. On the other hand the intermediary device does not need to learn device identifiers, except for the outgoing IP address that the devices use, thus significantly limiting this issue. Remaining privacy issues may be resolved through other means, e.g., legal certification.

The intermediary device may function in different manners. A number of these are discussed below.

In an embodiment, the first device initiates a first communication channel over the computer network to the intermediary device arranged to exchange messages between the first device and the intermediary device. The first communication channel is used to establish the session identifier (SID). The second device initiates a second communication channel over the computer network to the intermediary device arranged to exchange messages between the second device and the intermediary device. The second communication channel is used to send the registration message.

After the first device 100 received the session identifier and after the second device 200 sent the session identifier the first and second communication channels are maintained between the intermediary device and the first and second devices.

The cryptographically protected message is sent to the intermediary device over the first or second communication channel. The intermediary device, say the forwarding unit, selects the other of the first or second communication channel from the communication channel over which the cryptographically protected message was received at the intermediary channel and forwarding said cryptographically protected message to the other of the first or second channel. In this embodiment, the session identifier is only needed to setup the channel; the session identifier is no longer needed after set-up of the protected channel. On the other hand it is required that the first and second channels are maintained. If a channel is terminated and reestablished later, a new session identifier must be registered.

Figure 2B:
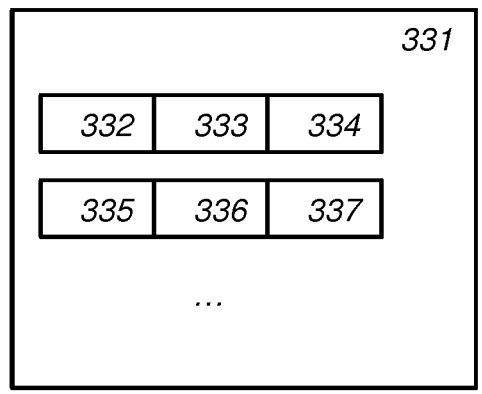
Figure 2C:
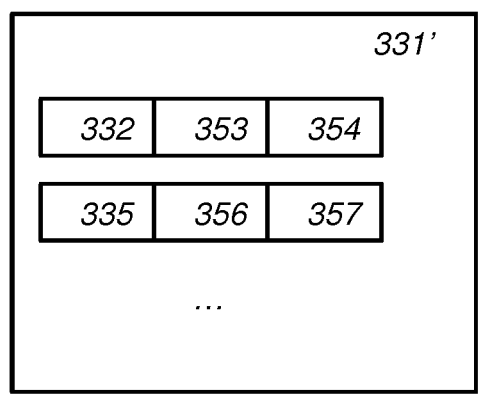

For example, a registration memory 331 that may be used in this embodiment is shown in FIG. 2*b*. Registration memory 331 may store a session identifier 332, say the session identifier SID, established between the intermediary device 300 and first device 100. Associated with session identifier 332, e.g., stored together, is a first handle 333 of a first communication channel and a second handle 334 of a second communication channel. In computer programming, a handle is a reference to a resource, e.g., to a network connection. A handle may be represented as an integer, a pointer and the like. Upon receiving a message over the communication channel referenced by the first handle 333 (or second handle 334), the forwarding unit 340 finds the second handle 334 (or first handle 333) in registration memory 331 and forwards the message received to the communication channel referenced by second handle 334 (or first handle 333).

Handles to connections may be seen as connection objects within the software environment of the intermediary device. The connection objects of the first and second device may be stored in a single session object. The session object may be stored in an associative memory. For example, in the art use has been made of a so-called session-object comprising a connection-object of the incoming client for which the session is started. In an embodiment, the intermediary device may store a session-object comprising two connection objects related to the same session. The two connection objects describe the incoming connection from the first and second device respectively.

The intermediary device may forward for multiple pairs of first and second devices. For example, registration memory 330 shows a session identifier 335, and first handle 336 and second handle 337 corresponding to different first and second devices respectively. An advantage of this embodiment is that the session identifier is only needed to establish the protected communication channel 342. After that, the first and second device can communicate over the first and second communication channel as if they were directly connected. How channel 342 is established may be kept hidden from user of the channel, e.g., application. Existing application need only modify the set-up of the channel, to be compatible with this channel 342. There are many alternative ways to associate a first and second handle with each other in an electronic memory.

Alternatively, registration memory 331 may be implemented as a so-called associative array. An associative array is a data type used to access multiple index-value pairs; given an index, the associative array maps the index to the associated value. In case of registration memory 331, the session identifier may be used as the index, the handle as the value. When the second device registers with the session identifier the handle of the connection with the first device is retrieved from the associative array. At this point intermediary device 300 may cause the connection channels represented by first handle 333 and second handle 334 to connect to each other. For example, intermediary device 300 may store first handle 333 and second handle 334 in a routing table, indicating that all communication coming in over the first handle is routed to the second handle, and vice versa.

Intermediary device 300 may store the second handle in the associative array as well. Intermediary device 300 may be arranged as follows: when a registration request arrives and the associative array shows a single handle, then the protected communication channel is established, if the associative array shows two handles, both communication channels represented by the two handles are terminated.

The handles may be so-called connection objects. For example, these could be socket objects.

In further memory (not shown) the handles may be associated with computer network addresses.

Using handles to identify the first and second device is particularly suited to implement the first and second communication channels using the transport layer security (TLS), e.g., TLS version 1.0, 1.1., 1.2, 1.3, etc., e.g. as defined in RFC 6176.

Instead of using handles the forwarding unit 340 may use computer network addresses, e.g. using registration memory 331'. Registration memory 331' stores a session identifier 332, say the session identifier SID, established between the intermediary device 300 and first device 100. Associated with session identifier 332, e.g., stored together, is a computer network address 353 of a first communication channel and a computer network address 354 of a second communication channel. Upon receiving a message over the communication channel from the computer network address indicated by the address 353 (or 354), the forwarding unit 340 finds the computer address 354 (or 353) in registration memory 331' and forwards the message received to the computer address 354 (or 353). A computer address may be an IP address, possibly together with a port address.

In an embodiment, the first and second device 100, 200 comprise a digital certificate of the intermediary device, say an X.509 certificate. For example, first and second device 100, 200 may receive the certificate over the computer network. Likewise, the intermediary device may comprise a first and second digital certificate of the first and second device respectively, e.g., receive it over the computer network. The certificates may contain a public key of the respective devices. A public key corresponds to a private key of the respective device. The first device may protect its communication with the intermediary device using the certificate of the intermediary device and its own private key corresponding to the first certificate. Likewise, the intermediary device and the second device may protect its communication with its own private key and the certificate of the recipient. Protection may include encryption and authentication Certificates may used with or without TLS, for the first and second channel.

In an embodiment, the registration unit 330 is arranged to detect if a further registration message is received over the computer network comprising the session identifier and terminating the cryptographically protected communication channel if so. This protects against an attacker that obtains the session identifier. For example, this may happen if the attacker has access to the first out-of-band channel. For example, if a computer readable image is used, the attacker may scan said image using a smartphone of his own, e.g., using so-called shoulder-surfing. However, in this situation both the valid user and the attacker will attempt to use the same session identifier in the registration message. Once this is detected both registration requests are rejected.

Instead of identifying the indented recipient of a message from the source, the intermediary device may also require that each cryptographically protected message is sent to the intermediary device together with the session identifier. In an embodiment, the message units of the first and second device are arranged to send. Forwarding unit 340 is arranged to selecting the other of the first or second device from the session identifier received with the cryptographically protected message. This embodiment does not require a maintained channel, instead an intermittent channel may be used.

Also in an embodiment that uses the session identifier to identify the device to which the message must be forwarded instead of the source address or source channel may terminate forwarding when a session identifier is reused. For example, in an embodiment, the registration device may record the session identifier associated with a first computer network address of the first device and a second computer network address of the second device. The forwarding device detects if a message is received over the computer network comprises the session identifier together with a computer network address different from the first address and the second address.

Figure 3:
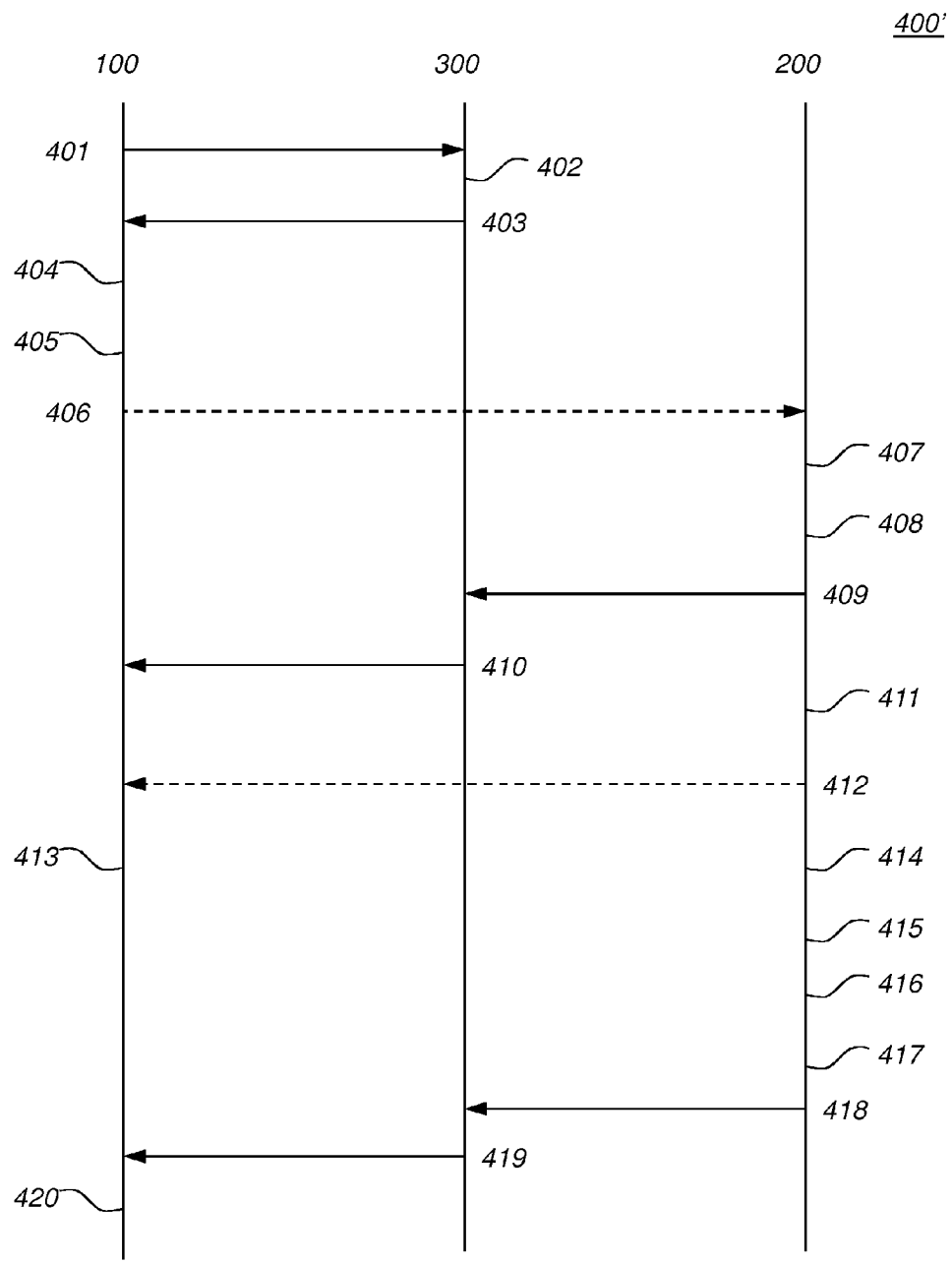

FIG. 3 schematically shows in the form of sequence diagram an example of an embodiment of a cryptographic method 400' for establishing a cryptographically protected communication channel between a first device and a second device. Method 400' is a refinement of method 400, and contains a number of independent and optional additions.

Method 400' comprises generating 407 by the cryptographic unit 230 of the second device 200 a second random number ($\beta$) and determining 408 a second key element from at least the second random number, the second key element being arranged for later constructing the shared cryptographic key, that is shared between the first device and the second device. The second key element may be the same as the second random number.

The second device 300 sends 409 the second key element to the intermediary device together with the session identifier. The intermediary device is arranged to forward 410 the second key element to the first device, say through the forwarding unit.

The key derivation function is applied by the first device to at least the first random number and the second key element, and by the second device to at least the second random number and the first key element.

The second key element passes through the intermediary device and is thus potentially known to someone who controls the intermediary device. However, as the shared cryptographic key depends also on the first key element, this need not be a problem. With knowledge of second key element without the first key element, the shared cryptographic key cannot be derived.

Introducing the second key element protects against an attacker with access to the first out-of-band channel that obtains the first key element. As he has no access to the second key element, he cannot compute the shared cryptographic key. For example, an attacker that sees the screen of the user and the computer readable image will only be able to capture value $\alpha$, but not value $\beta$ and hence cannot compute the shared secret K. On the other hand, an attacker that listens in on the network connection may possibly be able to capture value $\beta$; although the latter will be hard if the connection between the second device and the intermediary device is protected, say encrypted, using the intermediary device's certificate. This attacker does not have access to the value $\alpha$ and hence cannot compute the shared secret K. The same holds for the intermediary device.

For example, suppose that connections to the server are not insecure, e.g., because line security is not in place or incorrectly installed. An attacker with a network sniffer would still see encrypted packets passing by. The second key element $\beta$ makes it difficult for the attacker to obtain the corresponding key. For example, an attacker who happens to see the first key element, say by making a picture of a computer readable image, may not yet have turned on the network sniffer to the correct IP address, and thus missed the message comprising the second key element.

There is an additional benefit to using the second key element. In many embodiments the random number generator of the second device is better than the random number generator of the first device. For example, the second device may be a smart phone, as these are closed hardware platforms, security is much better controlled. For example, the random number generator of the smart phone may be arranged to derive a true random seed from noise of a physically unclonable function. If the random number generator of the first device is weak, the entropy in the shared key will nonetheless be higher since it also depends on the second key element. Consider as an extreme example, a first device in which an attacker forces, say through malware, that the first random number is always 0. In this case the shared key will always be the same. Having a second random number avoids this attack scenario.

Nevertheless, in a simplified embodiment for a low security application the shared cryptographic key may be derived from the first key element only.

Method 400' comprises an additional independent feature, which may be used with or without the second random number.

In some situations, an attacker with access to the computer network may not be able to read communication to and from the intermediary device, e.g., because it is encrypted, but may be able to block network traffic. In particular, an attacker may be able to block traffic between the second device and the intermediary device. This leads to the possibility of an attack, during access to the first out-of-band. The attacker blocks traffic to the second device and registers himself using the first key element and session identifier obtained during access and a second random value generated by himself.

In an embodiment, the second device is arranged to generate 411 a third random number ($\gamma$), and to send 412 the third random number to first device over a further out-of-band channel that requires human interaction with the first device. For example, the first device may comprise a further receiving out-of-band unit 145, and the second device may comprise a further sending out-of-band unit 245.

The key derivation function is applied by the first and second device to the third random number; e.g. over the first random number and the third random number, or, e.g., over the first key element, the second random number, the third random number by the second device, and over the first random number, the second key element and the third random number by the first device. If key elements are the same as the random number, the shared secret K may be computed as $K=h(\alpha,\beta,\gamma)$. The function h may be a cryptographic hash function, a key derivation function, and the like.

The third random value $\gamma$ can be generated on the second device, say a mobile phone, and shown on a display of the second device. The second out-of-band channel may be formed by the user typing the third random value in on the first device, for example in the form of a PIN code or password.

The further random number makes it impossible for an adversary to spoof the second device since he cannot provide $\gamma$ to the first device. The two out-of-band channels maybe of a different kind, making it hard for an attacker to gain access to both. For example, even if the attacker could read, say a QR code, and obtain the first key element; this does not imply that he can type a code at the first device. For the first part shoulder-surfing may suffice, for the second actual access is needed. This increases the security level.

Another way to guard against an attacker who gained access to the first random element is to generate 415, by the second device a fourth random number ($\delta$), sending the random number over the established cryptographically protected communication channel to the first device; and obtaining 420 user confirmation by the first device 100 that the generated random number equals the random number received by the first device.

For example, the fourth random number may be displayed on a screen of the second device and on a screen of the first device. The user can type a button, or touch a screen, etc, of the first device. to indicate that the two numbers agree. The numbers need not be displayed in numeric form, but may be shown as a phrase, a letter sequence, an image, and the like.

Also here it is assumed that attacker could view the first key element, but cannot give the required confirmation as he does not have physical access to the first device. The fourth random number may be sent to the first device, in the message generated in 416. Using the fourth random number does not require a second out-of-band channel.

In an embodiment, the system uses a first out-of-band channel formed by a computer readable image displayed on display screen and uses either the third or fourth random number described above.

As noted, the first key element may be equal to the first random number, and the second key element may be equal to the second random number. However, in an embodiment, the random numbers are different from the key elements. Any key agreement protocol may be modified for use in cryptographic system 10.

In particular, key agreement protocols based on Diffie-Hellman may be used, e.g., DH, ECDH, ElGemal and the like. For example, cryptographic unit 130 of the first device 100 may calculate the first key element by raising a generator (g) of a group (G) to the power of the first random number ($g^\alpha$). There are many types of groups suitable for this, e.g., cyclic groups, e.g., the integer modulo a prime number, e.g., elliptic curve groups, etc. The group is referred to as having a multiplicative notation for the group operation, accordingly, repeated application of the group operation is referred to as raising to a power; equivalently, any group which group operation is referred to as additive, for which a repeated application of the group operation may be referred to as 'times', can be referred to equivalently using multiplicative wording.

Typically, the devices 100, 200 and 300 each comprise a microprocessor (not shown) which executes appropriate software stored at the devices; for example, that software may have been downloaded and/or stored in a corresponding memory, e.g., a volatile memory such as RAM or a non-volatile memory such as Flash (not shown). Alternatively, any one devices 100, 200 and 300 may, in whole or in part, be implemented in programmable logic, e.g., as field-programmable gate array (FPGA), implemented, in whole or in part, as a so-called application-specific integrated circuit (ASIC), i.e. an integrated circuit (IC) customized for their particular use.

In an embodiment, the electronic intermediary device comprises a communication circuit, a session identifier circuit, a registration circuit, and a forwarding circuit. The electronic first device comprises a communication circuit, a session identifier circuit, a cryptographic circuit, a sending out-of-band communication circuit, and a message circuit. The electronic second device comprises a communication circuit, a receiving out-of-band communication circuit, a cryptographic circuit, a registration circuit, and a message circuit. The circuits are arranged for the functions of the corresponding units, e.g., the circuits implementing the corresponding units described herein.

The circuits may be integrated circuits. The circuits may be a processor circuit and storage circuit, the processor circuit executing instructions represented electronically in the storage circuits. The circuits may also be FPGA, ASIC or the like. The system may comprise additional circuits, e.g., a further sending or receiving out-of-band circuit, etc.

Many different ways of executing embodiments of methods 400 and 400' are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, elements 407, 408 may be done earlier, e.g., pre-computed before element 401; for example, element 413 may be done after element 404 and before element 406, in case no second random number is used; for example, element 414 may be done after element 408. A given element may not have finished completely before a next step is started.

A method according to the invention may be executed using software, which comprises instructions for causing a processor system to perform method 400, 400'. Software may only include those steps taken by a particular sub-entity of the system, e.g. devices 100, 200 or 300. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

The ability to establish a cryptographically protected channel between two device that, a priori, do not share any secret, and are not capable of establishing a direct connection may be used in many applications.

For example, a smartphone as second device 200 may replace several security devices, and take over functionality from traditional bank cards, authentication tokens and identity devices.

For example, a secure connection may easily be set-up between a smartphone as second device 200 and a user's PC or tablet as first device 100. With this connection setup, the phone can provide several security functions to the PC or tablet, such as providing cryptographic keys, encrypting/decrypting data, computing/verifying digital signatures, and executing authentication protocols. Thus also for transactions that are done from the user's PC or tablet, the personal smartphone may be used as the security device.

Two applications that are especially suitable to system 10 are described in more detail below.

Figure 4:
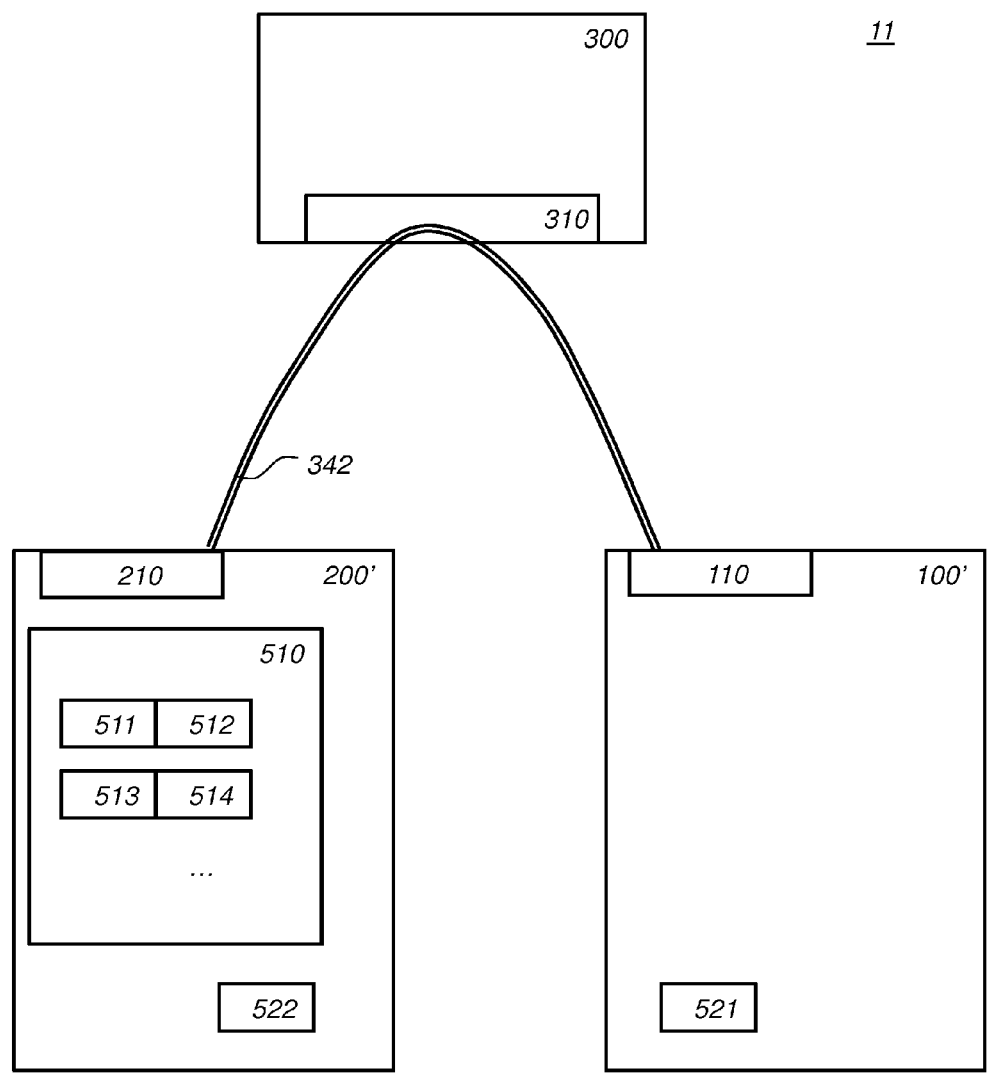
FIG. 4 schematically shows in the form of a block diagram an example of a secrets management system 11.

FIG. 4 schematically shows in the form of a block diagram an example of a secrets management system 11. For example, secrets management system 11 may be used as a password manager.

System 11 comprises a first device 100', a second device 200' and an intermediary device 300 that are arranged to establish a cryptographically protected channel 342 as described above.

Second device 200' comprises a storage 510, e.g., a memory, say a non-volatile memory. Storage 510 stores a list of secrets and associated secret identifiers. A secret may be, e.g., a password, say for a website, a cryptographic key, and the like. FIG. 4 shows secrets 511, and 513 with associated secret identifiers 512 and 514, respectively. There may be more secrets and identifiers. Second device 200' comprises a second key manager 552. First device 100' comprises a first key manager 521. Storage 510 is preferably stored in encrypted form, say encrypted with a master key of second device 200'. The master key may be stored at second device 200', or derived from a physical unclonable function (PUF) comprised in second device 200'. The latter operation may use so-called helper data to remove noise from the PUF; the helper data may be stored at device 200'. The use of a PUF and helper data to derive a key is known in the art per se.

The first key manager 521 is arranged to send a secret identifier to the second device over the established cryptographically protected communication channel to the first device, e.g., when the secret is needed to execute an operation.

The second key manager 522 may respond by selecting a secret from the list associated with said received secret identifier, and sending the selected secret to the first device over the established cryptographically protected communication channel. Optionally, first key manager 521 may be arranged to obtain user confirmation that said selected secret may be shared with the first device, before sending said secret to the first device.

First key manager 521 may be arranged to send a secret identifier together with a secret. In this case, second key manager 522 is arranged to store said secret identifier associated with the secret in storage 510.

In an embodiment, second device 200 comprises only a single secret, in which case the secret identifiers may be dispensed with.

For example, first device 100 may be arranged for web browsing. When a password is needed, the first device sends a secret identifier indicating the required password; say a URL of the web site, or a hash thereof.

This embodiment is well suited to a second device 200' embodied as a mobile phone.

In an embodiment of secrets management system 11, second device 200' is a mobile device, e.g. a mobile phone or tablet, and second key manager 522 is a computer program arranged to run on the mobile device. Storage 510 is arranged to store passwords. In addition, or instead, of passwords also other data may be stored, e.g., usernames, login codes, credit card data, etc. Mobile phone 200' may be used as a central device for securely storing and managing a user's passwords for various websites.

The example below will assume a second device 200' is mobile phone. Second key manager 522 may be a mobile app, e.g. downloaded to the mobile phone from an app store, such as Google Play. Passwords may be stored on the mobile phone through the mobile app. The mobile app may have access to a secure storage mechanism to store the passwords. For example, the secure storage mechanism may be, e.g., security services in a so-called trusted execution environment (TEE), or a PUF based key storage mechanism, etc.

In an embodiment, the first device runs a web-browser. The first device may be a desktop computer, but this is not necessary. The first device may also be another device arranged for web-browsing say a tablet. The first and second devices are two different devices.

First key manager 521 may be software running under the control of the web-browser, e.g., a so-called plug-in or add-on of the web-browser. The web-browser may be (but not limited to) Microsoft Internet Explorer 11, Firefox version 38.0.5, Chrome version 43, etc. In this embodiment, first key manager 521 may be a password manager application for the web-browser. The web-browser is used to access websites that are secured with a password, e.g., for example to work on documents that are stored in the cloud.

Web-browsing is used as an example; instead of a web-browser another application running on the first device that requires one or more passwords may be used. Instead of a plug-in or add-on also a stand-alone first key manager may be used that cooperates with the application.

The browser plug-in on the first device is used to connect to the mobile phone app via the secure channel mechanism, described above, e.g., by scanning a QR code or a web page.

The connection between mobile app and browser plug-in need only be set-up, e.g., at the beginning of a user's working day. From that point on the secure channel between mobile phone and browser plug-in may remain open for sending requested passwords from phone to plug-in and thus to the website. Passwords can be securely transmitted from the user's mobile phone to the first device, e.g. a PC, he/she is working on, via the secure channel mechanism described herein.

During browsing on the first device, a website may be accessed for which the user needs to login. The user may activate the plug-in, e.g., by pressing a button of the plug-in. The plug-in is arranged to fetch the password from the phone and enter it automatically in the password field of the website. In addition to a password also a username, etc, may be fetched and entered. As noted the secret identifier indicating the required password may be derived from a web-page that contains a log-in prompt. For example, the secret identifier may be a URL of the web site, or a hash thereof, an identifier of the web page, a username, and any combination or hash thereof.

The plug-in may also be arranged to automatically fetch usernames, passwords and fill those in the corresponding fields of the login website without requiring the user to activate the plug-in, e.g. press any buttons. For example, the plug-in may be arranged to recognize a web page as a log-in page and retrieve the required log-in credentials from the phone.

In addition to activating the plug-in to retrieve a password, the plug-in may also be arranged to add a password, or other credential to the storage 510. For example, after filling in a login or completing a registration say at a website, the user may active the plug-in, say he may press a store password button. In response thereto the plug-in may send the password and optionally other information such as username and/or web site identifying information, e.g. a URL over the secure channel to phone 200'.

The plug-in may have a retrieve button and a different store button to retrieve and store passwords respectively. In an embodiment, the plug-in may have an activate button. In response to the activate button the plug-in determines from the web-site context if a password needs to be retrieved or stored. For example, website context may be determined from the fact whether the user is currently logged in, whether a password field has been filled in, from certain words or phrases appearing on the website page, etc.

The password manager 11 is convenient, since a user can access password protected websites without having to remember passwords. At the same time security of the storage of the password has improved. However, this ease of use also comes with some security concerns. Suppose, a user leaves his the first device, say a PC, unattended for a moment and a malicious co-worker manages to control the user's browser. Since the channel to the phone remains intact, the malicious co-worker can simply access all websites on behalf of the user without him noticing. The co-worker will not know the passwords, but these will be supplied by the plug-in and phone.

A solution would be to add another password or PIN code that the user needs to enter each time before the phone provides access to the user's passwords. This will reduce the number of passwords that has to be remembered to a single password. However, such a measure still requires some remembering on the part of the user.

In order to provide some more control on the propagation of the user's passwords without impacting the ease of use, a notification system may be added to system 11.

In an embodiment, the second key manager 522, say the mobile phone app, is arranged so that upon receiving a request for a password over the secure channel, the mobile phone app notifies a user of the second device. The request includes the secret identifier that identifies a secret in storage 510. A notification may be a sound, an image, a light, a vibration, etc, or a combination thereof. The user notification may be a pop-up window that overlays other applications on the second device 200'.

Since the user receives a notification message on his phone every time the browser plug-in fetches a password from the phone, the user is alerted when unintended password requests are being made. In response he can return to the first device and take appropriate action.

In an embodiment, the second key manager 522 is arranged to obtain user confirmation that sending the selected secret is authorized, the selected secret only being sent if said authorization is obtained. For example, the user may be required to tap a button, swipe the screen possibly following some path over the screen, etc. In an embodiment, user confirmation does not require a password or other secret information from the user. In this way the security is shifted from access to the first device to access to the second device. As a mobile phone can be taken with the user, this is easier to guard. The user notification may be combined with a required user confirmation. In an embodiment, the user confirmation requires secret knowledge of the user, say a password.

The user notification concept can be extended in the following ways: The notification system can use several levels of notification that can for example be set by the user in the settings of the phone application. Notification levels can vary between any combinations of: no alerts, making a sound, vibrating, showing message in notification area, display a pop-up message, show message on lock-screen, present a message with authorization confirmation, e.g., a button to be clicked by the user before password is released to browser plug-in, etc.

The notification level can automatically be adapted to certain situations or context such as the device's location. In an embodiment, the notification mechanism is chosen in dependence on the location of the user. For example, when the smartphone is located at home or at work the notification level is set to only make a sound, whereas in other locations user confirmation is required.

In an embodiment, the second key manager 522 comprises a white list. The white list may, e.g., be configured by the user, e.g., through the second key manager 522. Second key manager 522 is arranged to send a password only for websites that are on the white list.

In an embodiment, the second key manager 522 may display identifiers for the websites on the white list. The identifiers may be website names, or logo's or domain names, or URLs, etc. By selecting, e.g., tapping on one of the website identifiers the second key manager 522 sends a message over the secure channel to the first key manager 512, e.g., the browser plug-in. The message comprises a web site identifier, e.g., a URL, etc., and instructs the first key manager 512 to cause the web browser to browse to the website. Second key manager 522 also sends the password and/or other information to the first key manager 521, e.g., in the same or a further message. In this embodiment, the first key manager 521 need not be configured to request passwords.

In an embodiment, the white list may contain only a website identifier. For example, in a banking application, a user can connect his browser to a banking website on the first device by activating a banking app on his second device, e.g. phone, tablet etc. The second device also provides the log-in credentials, e.g. a password. The second device may also execute an authentication protocol, e.g., a cryptographic challenge response protocol with the bank, e.g., Kerberos, SSL, etc. The second key manager 522 may thus supply a password to a bank through the secure channel, the first key manager, the browser, and eventually the internet.

Password requests could be logged, e.g., on the phone, in a connected cloud environment that supports the phone app, or in the first device, etc., such that the user can review and trace back actions that have been taking place.

The first key manager may be PC software, a browser plug-in, a standalone application or it may be integrated into other software such as the operating system, a web browser or an LDAP service, etc.

Figure 5:
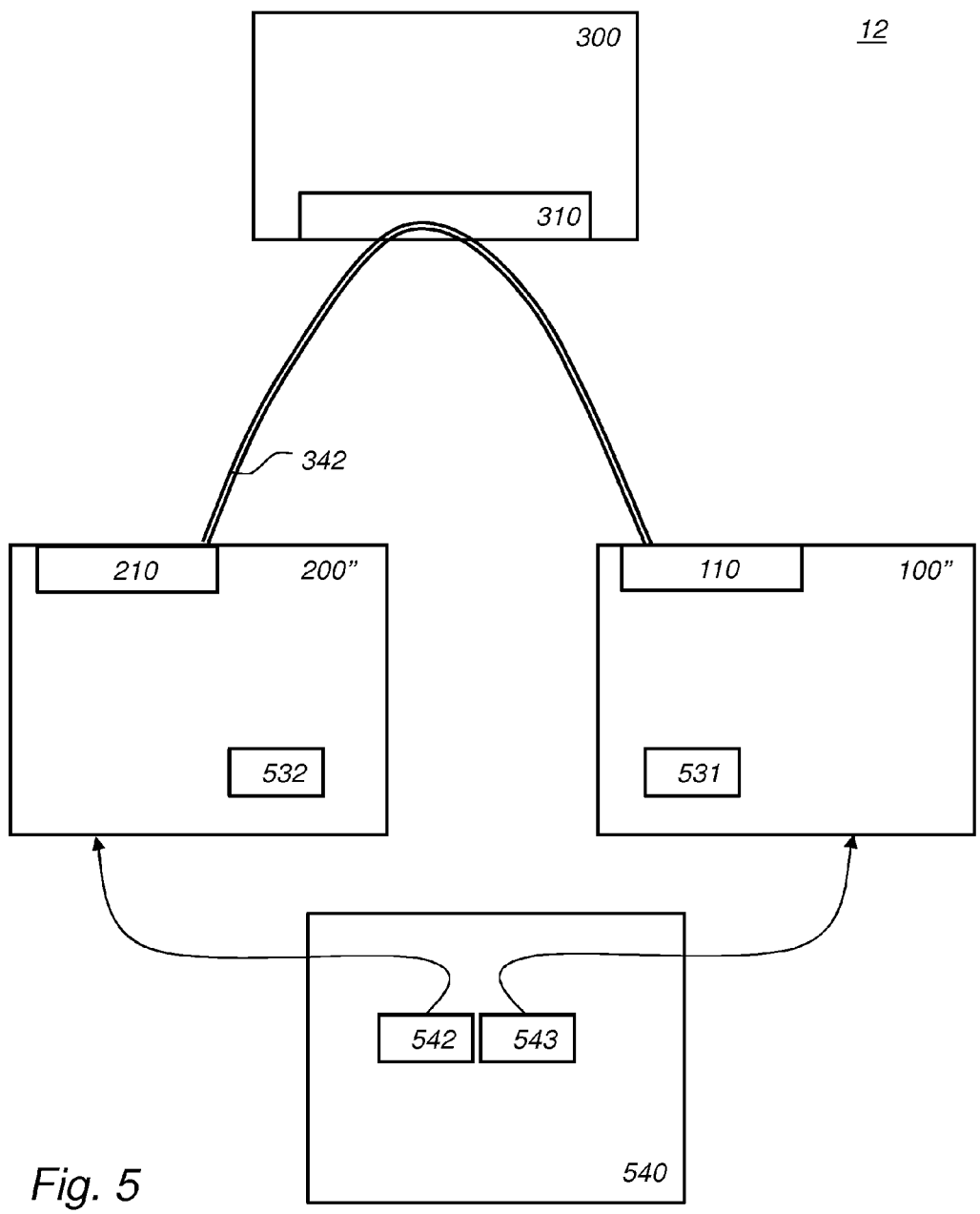
FIG. 5 schematically shows in the form of a block diagram an example of a content management system 12.

FIG. 5 schematically shows in the form of a block diagram an example of a content management system 12. For example, content management system 12 may be used as a cloud storage system, which may be used by a user to securely store content in the cloud. For example, system 12 may be used for a digital rights management (DRM) system.

System 12 comprises a first device 100", a second device 200" and an intermediary device 300 that are arranged to establish a cryptographically protected channel 342 as described above. System 12 further comprises a content server 540.

First device 100" is arranged to receive encrypted content 543 over the computer network from the content server 540. Encrypted content 543 is content encrypted with a content key. Second device 200" is arranged to receive an encrypted content key 542 from the content server 540. Encrypted content key 542 is the content key encrypted with a key encryption key, Second device 200" comprises a second content management unit 532 arranged to obtain the key encryption key, decrypt the encrypted content key 542 to obtain the content key, and to send the content key to the first device 100" over the established cryptographically protected communication channel 342. The key encryption key may be previously obtained by second device 200", e.g., by registering second device 200" with content server 540. Alternatively encrypted content key 542 and encrypted content 543 may be sent to 100" after which encrypted content key 542 is forwarded to 200". After decryption the content key is sent back to device 100".

Second device 200" may obtain the encrypted content key 542 from content server 540; this option is indicated in FIG. 5.

First device 100" comprises a first content management unit 531 arranged to receive the content decryption key from second device 200", and to decrypt encrypted content 543 obtaining the content. The content may now be rendered, e.g., by first device 100". The advantage of this system is that the key encryption key does not leave the second device. Security measures in the second device may be kept at a higher level than the first device. For example, second device 200" may be a phone. Second device 200" may be used with multiple first devices 100".

The above arrangement may be used to implement a DRM system. For example, the encrypted content key 542 may be accompanied by a digital right indicating allowable processing of second 200" of the encrypted content key 542, e.g., an allowed number of decryptions of the encrypted content key 542.

The system may be arranged to store content of first device 100" at content server 540. In this case digital rights may be omitted, e.g., as a cloud storage system.

First content management unit 531 may be arranged to select a content encryption key and use it to encrypt content. First content management unit 531 sends the encrypted content to content server 540 over the computer network. The content encryption key is sent to second device 200" over protected channel 342. At this point first device 100" may erase, e.g. overwrite, the content key.

Second device 200" encrypts the content key with a key encryption key. In this case the key encryption key may be obtained by second device 200" by generating the key encryption key, retrieving it from storage, deriving it from a PUF, etc. The encrypted content key may be stored at second device 200", or may be stored at content server 540, e.g., by sending it over the computer network. In this case, content server 540 need not have access to the key encryption key or the content key. This allows first device 100" to securely store content, say documents, in the cloud, and store the access means at a secure device, e.g., a phone. The user can access his documents at multiple first devices.

FIG. 6a shows a computer readable medium 1000 having a writable part 1010 comprising a computer program 1020, the computer program 1020 comprising instructions for causing a processor system to perform a cryptographic method for an electronic first device, an electronic second device, and an electronic intermediary device to establish a cryptographically protected communication channel, according to an embodiment. The computer program 1020 may only include the actions taken by any one of the electronic first device, the electronic second device, and the electronic intermediary device. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of establishing a cryptographically protected communication channel.

FIG. 6b shows in a schematic representation of a processor system 1100 according to an embodiment. Processor system 1100 may be arranged as the first device, the second, or the intermediary device. The processor system comprises one or more integrated circuits 1110. The architecture of the one or more integrated circuits 1110 is schematically shown in FIG. 6b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments; thus increasing the intelligibility of the claim. These references shall not be construed as limiting the claim. There may be embodiments not illustrated with parenthesized references or formulas. Parenthesized references or formulas need not correspond to the same embodiment.

The invention claimed is:

1. A cryptographic method for an electronic first device, an electronic second device and an electronic intermediary device, the cryptographic method establishing a cryptographically protected communication channel between the first device and the second device, the first device and the second device being arranged to digitally communicate with the intermediary device over a computer network, the method comprising
   by the first device and/or the intermediary device: establishing a session identifier (SID),
   by the first device: generating a first random number ($\alpha$) and determining a first key element from at least the first random number, the first key element being arranged for later constructing a shared cryptographic key shared between the first device and the second device,
   by the first device: sending the session identifier and the first key element to the second device over an out-of-band channel,
   by the first device: applying a key derivation function to at least the first random number thus obtaining the shared cryptographic key for protecting communication,
   by the second device: applying a key derivation function to at least the first key element thus obtaining the shared cryptographic key,
   by the second device: sending a registration message comprising the session identifier to the intermediary device,
   by the first device and/or second device: communicating over the cryptographically protected communication channel by:
      generating a message,
      cryptographically protecting the message using the shared cryptographic key,
      sending said cryptographically protected message to the intermediary device, and
      by the intermediary device: forwarding said cryptographically protected message to the other of the first or second device.

2. A cryptographic method as in claim 1, wherein
   the first device initiates a first communication channel over the computer network to the intermediary device arranged to exchange messages between the first device and the intermediary device, the first communication channel being used to establish the session identifier (SID), and wherein
   the second device initiates a second communication channel over the computer network to the intermediary device arranged to exchange messages between the second device and the intermediary device, the second communication channel being used to send the registration message,
   the cryptographically protected message is sent to the intermediary device over the first or second communication channel, the intermediary device selecting the other of the first or second communication channel from the communication channel over which the cryptographically protected message was received at the intermediary channel and forwarding said cryptographically protected message to the other of the first or second channel.

3. A cryptographic method as in claim 1, wherein
   sending said cryptographically protected message to the intermediary device is sent together with the session identifier, the intermediary device selecting the other of the first or second device from the session identifier received with the cryptographically protected message.

4. A cryptographic method as in claim 1, further comprising
   by the second device: generating a second random number ($\beta$) and determining a second key element from at least the second random number, the second key element being arranged for later constructing the shared cryptographic key shared between the first device and the second device,
   by the second device: sending the second key element to the intermediary device together with the session identifier,
   by the intermediary device: forwarding the second key element to the first device,
   wherein
   the key derivation function being applied by the first device to at least the first random number and the second key element, and by the second device to at least the second random number and the first key element.

5. A cryptographic method as in claim 1, wherein sending the session identifier and the first key element to the second device over an out-of-band channel comprises:
   by the first device: encoding the session identifier and the first key element in a computer readable image and displaying the image on a display screen,
   by the second device: obtaining the computer readable image from the display screen using an image sensor and decoding said obtained computer readable image thus obtaining the session identifier and the first key element.

6. A cryptographic method as in claim 1, comprising
   by the first device: sending a computer network address of the intermediary device over the out-of-band channel to the second device, e.g., together with the session identifier and the first key element.

7. A cryptographic method as in claim 1, comprising
by the intermediary device: detecting if a further registration message is received over the computer network comprising the session identifier and terminating the cryptographically protected communication channel if the further registration message is received.

8. A cryptographic method as in claim 1, further comprising
by the second device: generating a third random number (γ), sending the third random number to first device over a further out-of-band channel requiring human interaction with the first device, the key derivation function being also applied by the first and second device to the third random number.

9. A cryptographic method as in claim 1, further comprising
by the second device: generating a fourth random number (δ), sending the fourth random number over the established cryptographically protected communication channel to the first device,
by the first device: obtaining user confirmation that the generated fourth random number equals the random number received by the first device.

10. A cryptographic method as in claim 2, wherein
the first key element is the first random number, and the second key element is the second random number, or
the first key element is a generator (g) of a group (G) raised to the power of the first random number ($g^\alpha$), and the second key element is the generator (g) of the group (G) raised to the power of the second random number ($g^\beta$).

11. A cryptographic method as in claim 1, comprising
by the first device: protecting communication with the intermediary device using a digital certificate of the intermediary device;
by the second device: protecting communication with the intermediary device using a digital certificate of the intermediary device.

12. A cryptographic method as in claim 1 further arranged for secrets management, comprising
by the second device: storing a list of secrets and associated secret identifiers,
by the first device: sending a secret identifier to the second device over the established cryptographically protected communication channel to the first device,
by the second device: selecting a secret from the list associated with said received secret identifier, and sending the selected secret to the first device over the established cryptographically protected communication channel.

13. A cryptographic method as in claim 12, further comprising
by the second device: notifying a user of the second device of receiving of the secret identifier
and/or
by the second device: obtaining user confirmation that sending the selected secret is authorized, the selected secret only being sent if said authorization is obtained.

14. A cryptographic method as in claim 1 further arranged for content management, comprising
by the first device: receiving content encrypted with a content key over the computer network,
by the second device: receiving the content key encrypted with a key encryption key, obtaining the key encryption key, decrypting said encrypted content key to obtain the content key, and sending the content key to the first device over the established cryptographically protected communication channel.

15. A cryptographic method as in claim 1, wherein the second device is a mobile device.

16. A non-transitory, tangible, computer-readable medium embodying a computer program comprising instructions arranged to cause a first device or a second device to perform the method of claim 1.

17. An electronic first device for establishing a cryptographically protected communication channel between the first device and a second device, the first device comprising
a communication unit arranged to communicate with an intermediary device over a computer network, first device being arranged to establish a session identifier (SID) with the intermediary device,
a cryptographic unit arranged to
generate a first random number (α), and
determine a first key element from at least the first random number, the first key element being arranged for later constructing a shared cryptographic key shared between the first device and the second device,
a sending out-of-band communication unit arranged to
send the session identifier and the first key element to a second device over an out-of-band channel,
the cryptographic unit being further arranged to
apply a key derivation function to at least the first random number obtaining the shared cryptographic key for protecting communication,
a message unit arranged to
generate a message,
cryptographically protect the message using the shared cryptographic key, and
send said cryptographically protected message to the intermediary device,
and/or to
receive a message cryptographically protected using the shared cryptographic key,
decrypt and/or validate said received message using the shared cryptographic key.

18. An electronic second device for establishing a cryptographically protected communication channel between a first device and the second device, the second device comprising
a communication unit arranged to communicate with an intermediary device over a computer network,
a receiving out-of-band communication unit arranged to
receive a session identifier and a first key element from the first device over an out-of-band channel,
a cryptographic unit arranged to
apply a key derivation function to at least the first key element obtaining a shared cryptographic key for protecting communication,
a registration unit arranged to send a registration message comprising the session identifier to the intermediary device
a message unit arranged to
generate a message,
cryptographically protect the message using the shared cryptographic key, and
send said cryptographically protected message to the intermediary device,
and/or to
receive a message cryptographically protected using the shared cryptographic key,
decrypt and/or validate said received message using the shared cryptographic key.

* * * * *